United States Patent
Kuga et al.

[11] Patent Number: 5,502,480
[45] Date of Patent: Mar. 26, 1996

[54] THREE-DIMENSIONAL VISION CAMERA

[75] Inventors: Kaeko Kuga; Takuzo Uemura, both of Kyoto, Japan

[73] Assignee: Rohm Co., Ltd., Kyoto, Japan

[21] Appl. No.: 377,589

[22] Filed: Jan. 24, 1995

[30] Foreign Application Priority Data

Jan. 24, 1994 [JP] Japan ................................ 6-005622
Mar. 31, 1994 [JP] Japan ................................ 6-062305

[51] Int. Cl.⁶ ........................................... H04N 13/02
[52] U.S. Cl. ........................ 348/46; 348/48; 348/49; 348/135
[58] Field of Search ........................... 348/46, 47, 48, 348/39, 38, 37, 36

[56] References Cited

U.S. PATENT DOCUMENTS

| | | | |
|---|---|---|---|
| 4,654,699 | 3/1987 | Medina | 348/46 |
| 5,081,530 | 1/1992 | Medina | 348/46 |
| 5,302,988 | 4/1994 | Nanjo | 348/49 |
| 5,349,378 | 9/1994 | Maali | 348/49 |

*Primary Examiner*—Tommy P. Chin
*Attorney, Agent, or Firm*—Nikaido, Marmelstein, Murray & Oram

[57] ABSTRACT

A three-dimensional vision camera where there is no disagreement between the video signal and the distance signal is provided by using the taking optical system for the distance measurement. A reflecting mirror 8 for reflecting a distance measuring laser beam from a laser diode 6 is arranged behind a taking lens 4. The laser beam is irradiated to a photographic object through the taking lens 4. The laser beam reflected by the photographic object is received by a photodiode array 7 through the taking lens 4 and the reflecting mirror 8. While the taking lens 4 is moved along the optical axis to perform photographing, the laser scanning is performed by rotating the reflecting mirror 8 about two axes vertical to the optical axis of the taking lens 4 to measure the distance.

4 Claims, 7 Drawing Sheets

3-D VISION SIGNAL

THREE-DIMENSIONAL VISION CAMERA

BACKGROUND OF THE INVENTION

1. Field Invention

The present invention relates to a three-dimensional vision camera for photographing a three-dimensional image.

2. Description of the Prior Art

As a method to observe a three-dimensional image, three-dimensional vision is known: a two-dimensional image is shot by a camera and information on the distance to the photographic object is obtained to produce a three-dimensional vision signal. The three-dimensional image is reproduced on a three-dimensional vision screen.

Referring to FIG. 1, there is shown the arrangement of a conventional three-dimensional vision camera for producing a three-dimensional vision signal. This three-dimensional vision camera is provided with an image sensor 51, a distance measurer 52 and a synthesizer 53. The image sensor 51 including a taking lens 54 and a charge coupled device (CCD) 55 serving as a light receiving element directs a light beam from a photographic object 50 to the CCD 55 to perform photographing. The CCD 55 converts the received light beam into an electric signal and outputs it as a video signal.

The distance measurer 52 including a light emitting diode (LED) 56 serving as a light emitting device and a photodiode array 57 serving as a light receiving device irradiates a light beam from the LED 56 to the photographic object 50. The reflected light beam is received by the photodiode array 57. In front of the LED 56, a lens 58 is provided for directing the irradiated light beam to the photographic object 50. In front of the photodiode array 57, a lens 59 is provided for directing the reflected light beam to the photodiode array 57. The photodiode array 57 converts the received light beam into an electric signal and outputs it as a distance signal. The distance to the photographic object 50 is detected based on the light received position on the photodiode array 57.

The synthesizer 53 produces a three-dimensional vision signal from the video signal from the CCD 55 and the distance signal from the photodiode array 57 and outputs the three-dimensional vision signal. The three-dimensional vision signal thus produced is transmitted to a three-dimensional vision screen (not shown) to display a three-dimensional image.

In the three-dimensional vision camera of the above-described arrangement, the image sensor 51 and the distance measurer 52 are separately provided and the photographing and the distance measurement are performed by the two individual optical systems. Thus, the image, i.e. two-dimensional information (x and y vectors) and the distance information (z vector) are obtained by the different optical systems, so that a disagreement is caused between the x and y vectors and the z vector. When the distance between the image sensing optical system and the distance measuring optical system is large, the disagreement between the vectors increases, so that the three-dimensional image displayed on the three-dimensional vision screen is unnatural. The reduction in distance between the image sensing and distance measuring optical systems is limited in the arrangement where the image sensor and the distance measurer are separately provided, so that it is impossible to produce a three-dimensional vision signal in which the vectors completely agree with each other.

SUMMARY OF THE INVENTION

An object of the present invention is to provide a three-dimensional vision camera in which no disagreement is caused between the two-dimensional image information and the distance information by using the image sensing optical system also as the distance measuring optical system.

To achieve the above-mentioned object, according to the present invention, in a three-dimensional vision camera where an image light beam incident through a taking lens is received by a photographic light receiving device including photoelectric conversion elements arranged in a matrix form to perform photographing and where a light emitting device emitting a distance measuring light beam and a light receiving device including photoelectric conversion elements arranged in an array form are provided, a first optical device which reflects the light beam from the light emitting device is arranged behind the taking lens, and a second optical device which transmits a light beam advancing from the light emitting device to the first optical device and reflects a light beam advancing from the first optical device to the light emitting device is arranged between the light emitting device and the first optical device. The first optical device is rotatable about an axis vertical to the optical axis of the taking lens. The taking lens is movable along the optical axis.

The light beam emitted from the light emitting device is reflected by the first optical device and passes through the taking lens to be irradiated to a photographic object. The light beam reflected by the photographic object passes through the taking lens to be reflected by the first and second optical devices and is directed to the distance measuring light receiving device. The distance to the photographic object is measured based on the position at which the distance measuring light beam incident on the light receiving device is received. When the distance measuring light beam is incident on a predetermined position of the light receiving device, the camera is focused on the portion of the photographic object to which the distance measuring light beam is irradiated.

At a plurality of predetermined positions on the path along which the taking lens is moved backward and forward along the optical axis, photographing is performed by the photographic light receiving device and the first optical device is rotated to measure the distance. The rotation of the first optical device varies the distance measuring light beam irradiated position on the photographic object to perform the distance measurement scanning. When the portion of the photographic object with respect to which the distance measurement scanning is performed is in focus at a position of the taking lens, the distance to the photographic object is obtained based on the position of the taking lens. The video signal of the photoelectric conversion element of the photographic light receiving device which receives the image light beam from the photographic object, and the distance information are synthesized into a three-dimensional vision signal. The three-dimensional vision signal is outputted.

In the three-dimensional vision camera of the above-described arrangement, the image light beam from the photographic object and the distance measuring light beam are incident on the same taking lens, so that a three-dimensional vision signal where the video information and the distance information always agree with each other is produced. As a result, a natural three-dimensional image is displayed on a three-dimensional vision screen.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
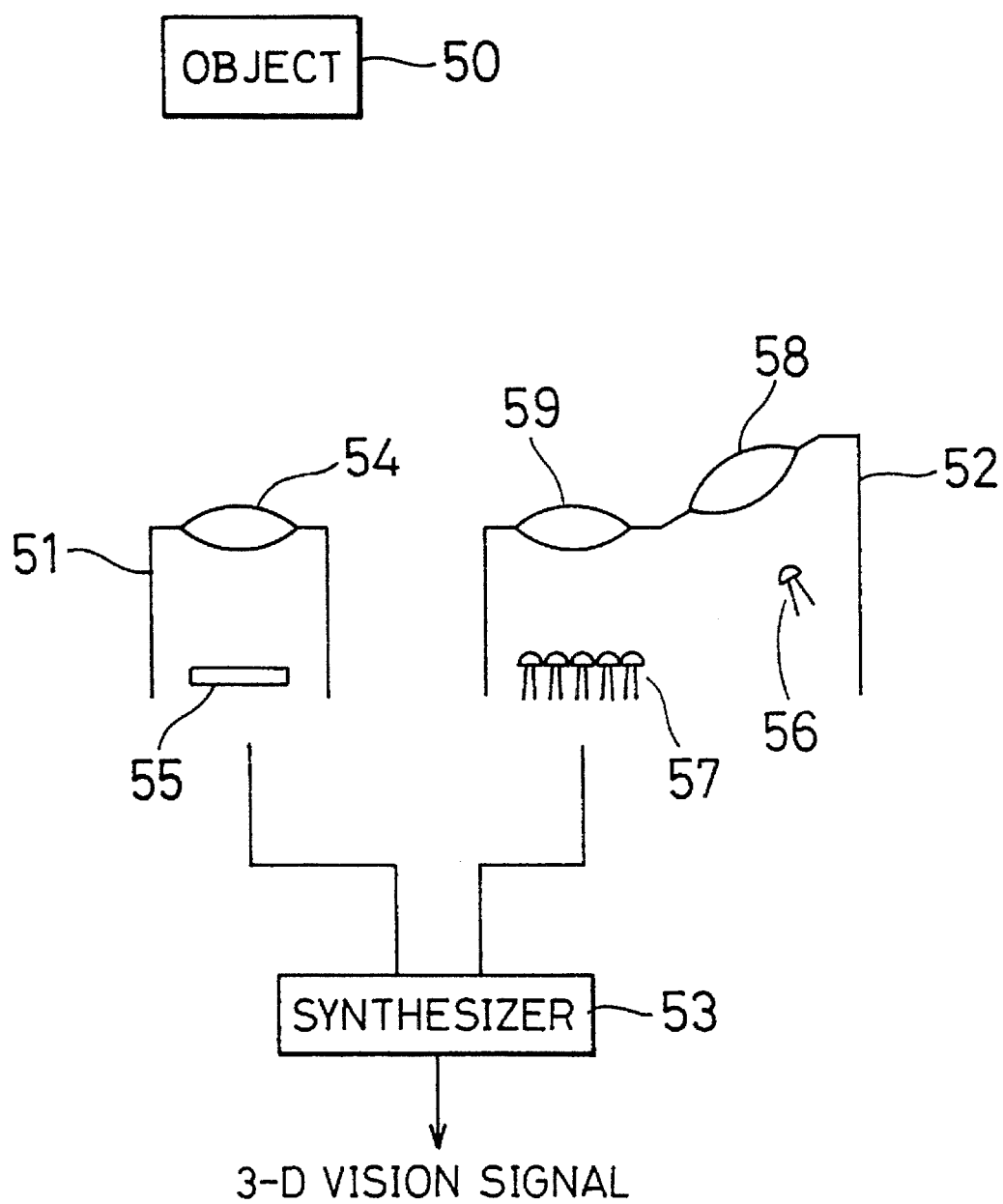
FIG. 1 shows the arrangement of a conventional three-dimensional vision camera.
Figure 2:
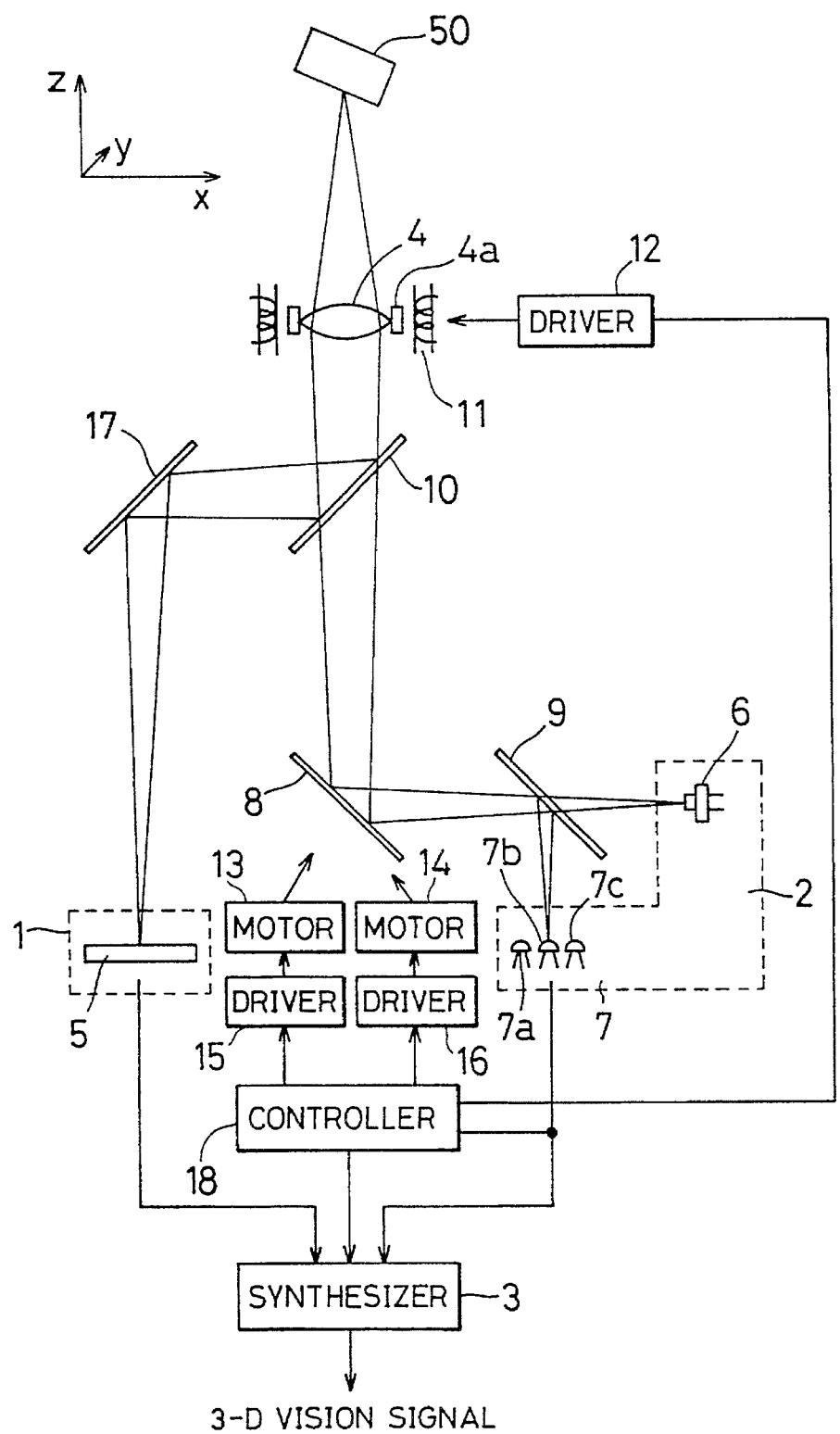
FIG. 2 shows the arrangement of a three-dimensional vision camera of the present invention.

Referring to FIG. 2, there is shown the arrangement of a three-dimensional vision camera of the present invention. Reference numeral 1 represents an image sensor including a CCD 5 serving as an image sensing light receiving device. Reference numeral 2 represents a distance measurer including a laser diode 6 serving as a distance measuring light emitting device and a photodiode array 7 serving as a distance measuring light receiving device. In the CCD 5, pixels are arranged in a matrix form. Each pixel outputs as a video signal an electric signal of a value in accordance with the quantity of the received light beam. The laser diode 6 emits a laser beam of a fine luminous flux. The photodiode array 7 includes three photodiodes 7a, 7b and 7c arranged linearly. Reference numeral 3 represents a synthesizer which produces a three-dimensional vision signal from an output of the image sensor 1 and an output of the distance measurer 2. Reference numeral 4 represents a taking lens.

The taking lens 4 is fixed within a lens barrel 4a provided with a magnet. The lens barrel 4a is held by a lens driver 11 having a coil so as to be movable along the optical axis of the taking lens 4. The coil of the lens driver 11 is supplied with a current from a driver circuit 12. The lens barrel 4a is moved by the generated electric field, so that the taking lens 4 is moved backward and forward along the optical axis.

Consider three axes x, y and z crossing at right angles to one another as shown in the figure. The direction along the optical axis of the taking lens 4 is a z direction, and the horizontal direction is an x direction. When the optical axis of the taking lens 4 is horizontal, the vertical direction is a y direction.

Behind the taking lens 4, a reflecting mirror 8 is arranged so that the optical axis of the taking lens 4 passes through the center thereof. The reflecting mirror 8 is arranged to be rotatable about an axis passing its center and parallel to the x axis and an axis passing its center and parallel to the y axis. Two step motors 13 and 14 are provided for supplying a rotational force to the reflecting mirror 8 through a non-illustrated power transmitting system. The step motor 13 rotates the reflecting mirror 8 about the axis parallel to the x axis. The step motor 14 rotates the reflecting mirror 8 about the axis parallel to the y axis. The step motors 13 and 14 have their rotational amounts controlled by driver circuits 15 and 16.

The laser diode 6 is set to emit a laser beam to the reflecting mirror 8 which reflects the laser beam toward the taking lens 4. A half mirror 9 is arranged on the optical path of the laser beam between the laser diode 6 and the reflecting mirror 8. The half mirror 9 transmits a light beam advancing from the laser diode 6 to the reflecting mirror 8 and reflects a light beam advancing from the reflecting mirror 8 to the half mirror 9. The photodiode array 7 is set at a position to receive a light beam reflected by the half mirror 9.

A half mirror 10 is arranged between the taking lens 4 and the reflecting mirror 8. A reflecting mirror 17 is arranged at a side of the half mirror 10. The half mirror 10 reflects the image light beam transmitted by the taking lens 4 toward the reflecting mirror 17 and transmits the laser beam of the laser diode 6. The CCD 5 serving as a photographic light receiving device is set at a position to receive a light beam reflected by the half mirror 10 and further reflected by the reflecting mirror 17.

In the three-dimensional vision camera of the above-described arrangement, to perform photographing, the image light beam from the photographic object 50 is transmitted by the taking lens 4, reflected by the half mirror 10 and further reflected by the reflecting mirror 17 to be incident on the CCD 5. The laser beam emitted by the laser diode 6 is transmitted by the half mirror 9, reflected by the reflecting mirror 8, transmitted by the half mirror 10 and transmitted by the taking lens 4 to be irradiated to the photographic object 50. The laser irradiated position on the photographic object 50 varies according to the set direction of the reflecting mirror 8. The laser beam reflected by the photographic object 50 is again transmitted by the taking lens 4, transmitted by the half mirror 10, reflected by the reflecting mirror 8 and reflected by the half mirror 9 to be incident on the photodiode array 7.

To separate the image light beam and the distance measuring laser beam from each other, a filter which transmits only the image light beam and a filter which transmits only the laser beam may be arranged in front of the CCD 5 and in front of the photodiode array 7, respectively.

When the taking lens 4 is set at a position to be in focus with respect to the laser irradiated position of the photographic object 50, the laser beam is incident on the central diode 7b of the three photodiodes 7a, 7b and 7c of the photodiode array 7, so that an electric signal is outputted from the diode 7b. When the taking lens 4 is slightly shifted from the position to be in focus with respect to the laser irradiated position, the laser beam is incident on the photodiode 7a and 7c, so that an electric signal is outputted from the photodiode 7a or 7c. When the taking lens 4 is largely shifted from the position, the laser beam reflected by the photographic object 50 is only slightly incident on the photodiodes 7a, 7b and 7c, so that no electric signal is outputted.

Thus, it is when an electric signal is outputted from the photodiode 7b that the taking lens 4 is in focus. Based on the position of the taking lens 4 at that time, the distance to the photographic object 50 is obtained.

The movement of the taking lens 4 and the rotation of the reflecting mirror 8 are controlled by a controller 18 comprising a microcomputer. The control of the driving of the taking lens 4 and the reflecting mirror 8 by the controller 18 is performed in the following manner:

First, the taking lens 4 is set at the rearmost end of its movable range, i.e. a position closest to the reflecting mirror 8 so as to be in focus with respect to infinity. The step motors 13 and 14 are driven under this condition to set the reflecting mirror 8 so that the laser beam emitted by the laser diode 6 is irradiated on the upper left end of the photographic range.

Then, the step motor 14 is driven while the laser irradiation is continued to rotate the reflecting mirror 8 about the axis parallel to the y axis. Thereby, the laser irradiated position is shifted rightward. When the irradiated position reaches the right end of the photographic range, the rotation of the reflecting mirror 8 is stopped, and the stop motor 13 is driven to rotate the reflecting mirror 8 about the axis parallel to the x axis by a predetermined amount, thereby slightly lowering the laser irradiated position. Then, the step motor 14 is driven in the opposite direction to shift the laser irradiated position leftward. By repeating this operation, the laser irradiated position is varied to the lower end of the photographic range.

The scanning in the x direction is performed by the rotation of the reflecting mirror 8 driven by the step motor 14. The scanning in the y direction is performed by the rotation of the reflecting mirror 8 driven by the step motor 13. During these scannings, the CCD 5 always receives the image light beam to continue photographing.

When the photographing and the scannings at the rearmost end of the movable range of the taking lens 4 are finished, the taking lens 4 is moved frontward by a predetermined amount and stopped. Then, the scannings in the x and y directions and the photographing by the CCD 5 are performed in the manner as described above. The in-focus distance is reduced by moving the taking lens 4 frontward. After the above-described operation is repeated until the taking lens 4 reaches a predetermined position, the movement direction of the taking lens 4 is reversed. In the rearward movement, the taking lens 4 is stopped at a predetermined position to perform photographing and the laser scannings.

The video signal from the CCD 5 and the output signal of the photodiode 7 receiving the distance measuring laser beam are always supplied to the synthesizer 3. The movement amount of the taking lens 4 and the rotation amount of the reflecting mirror 8 are supplied to the synthesizer 3 by the controller 18. When the output signal is supplied from the photodiode 7b, the synthesizer 3 produces and outputs a three-dimensional vision signal.

It is when the position to which the laser beam is irradiated is in focus that the signal is outputted by the photodiode 7b. Which pixel of the CCD 5 receives the image light beam from the in-focus position depends on the position of the taking lens and the set direction of the reflecting mirror 8. The synthesizer 3 decides the position of the pixel of the CCD 5 corresponding to the in-focus position based on the movement amount of the taking lens 4 and the rotation amount of the reflecting mirror 8. The distance from the camera to the in-focus position of the photographic object 50 depends on the position of the taking lens 4. The synthesizer 3 calculates the distance based on the movement amount of the taking lens 4, and synthesizes the video signal of the pixel and the distance information into a three-dimensional vision signal and outputs the signal. The three-dimensional vision signal not only includes the two-dimensional information (x and y vectors) and the distance information (z vector) but also is a signal where the x and y vectors and the z vector agree with each other.

Thus, in the three-dimensional vision camera of the present invention, while the taking lens 4 is moved backward and forward to always perform photographing irrespective of the focus condition, only a video signal of an in-focus position of the photographic object 50 is outputted. The backward and forward movement of the taking lens 4 is performed 60 or more times per second. As a result, a video signal is supplied with which the image is observed with no flicker.

Figure 3:
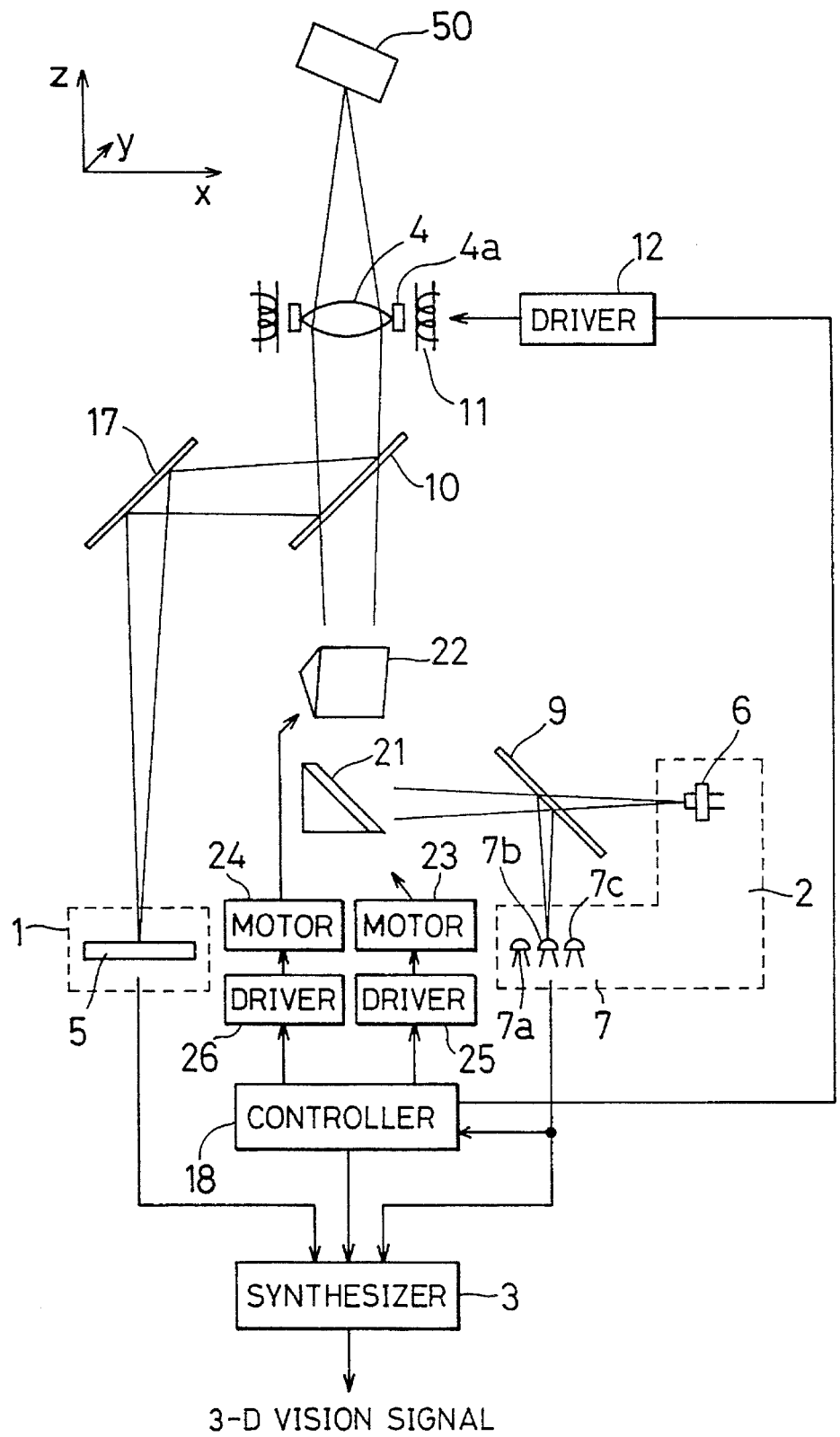
FIG. 3 shows another arrangement of a three-dimensional vision camera of the present invention.

While a single reflecting mirror 8 is used for the scanning of the distance measuring laser beam in the x and y directions in the three-dimensional vision camera of the above-described arrangement, two optical devices may be used for the laser scanning as shown in FIG. 3. Specifically, a prism 21 rotatable about the axis parallel to the y axis is arranged, and a prism 22 rotatable about the axis parallel to the x axis is arranged in front of the prism 21. To drive these prisms 21 and 22, step motors 23 and 24 and driver circuits 25 and 26 are provided. The controller 18 drives the step motor 23 through the driver circuit 25 to rotate the prism 21. Thereby, the scanning in the x direction is performed. Also, the controller 18 drives the step motor 24 through the driver circuit 26 to rotate the prism 22, thereby performing the scanning in the y direction. Instead of the prism 21, a reflecting mirror such as a polygonal mirror may be used.

Figure 4:
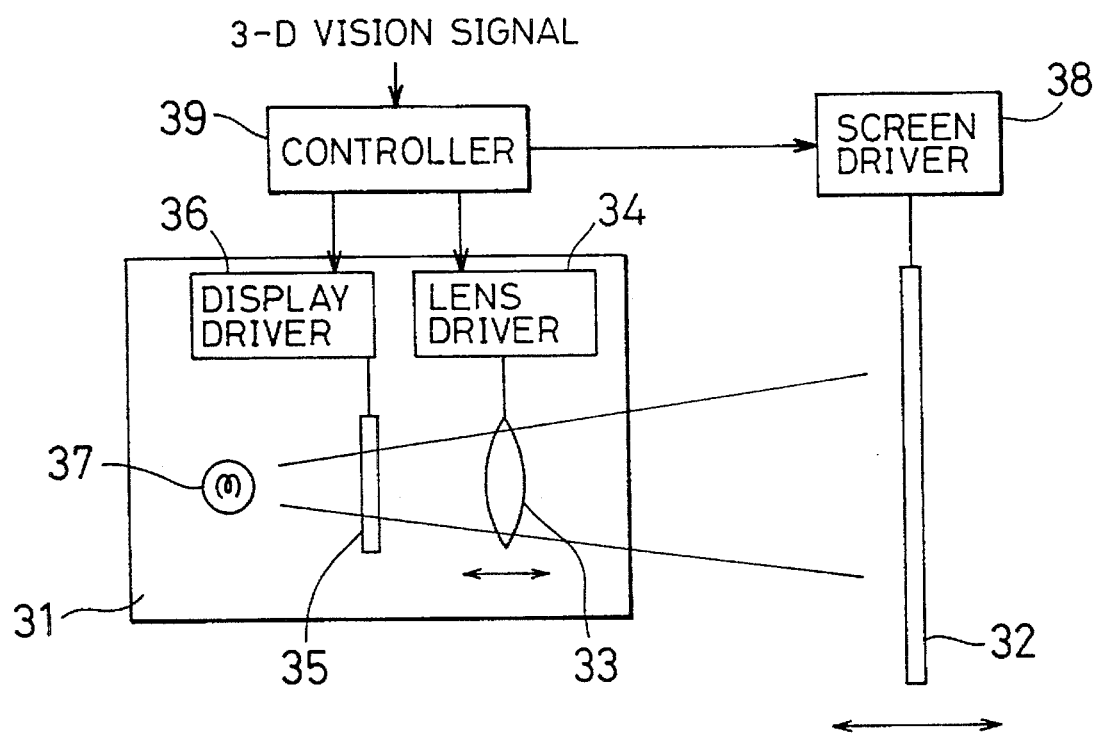
FIG. 4 shows a first arrangement of a three-dimensional image display apparatus.
Figure 5:
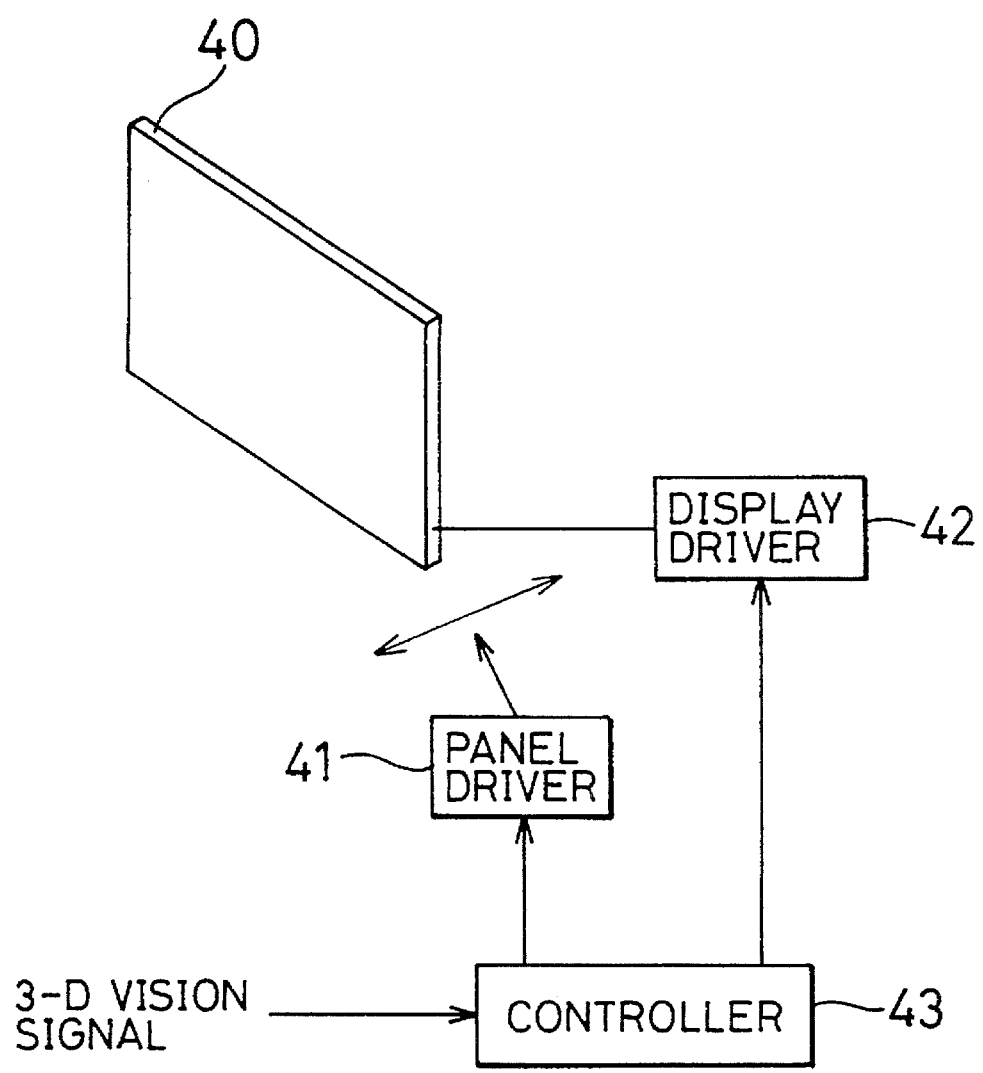
FIG. 5 shows a second arrangement of a three-dimensional image display apparatus.
Figure 6:
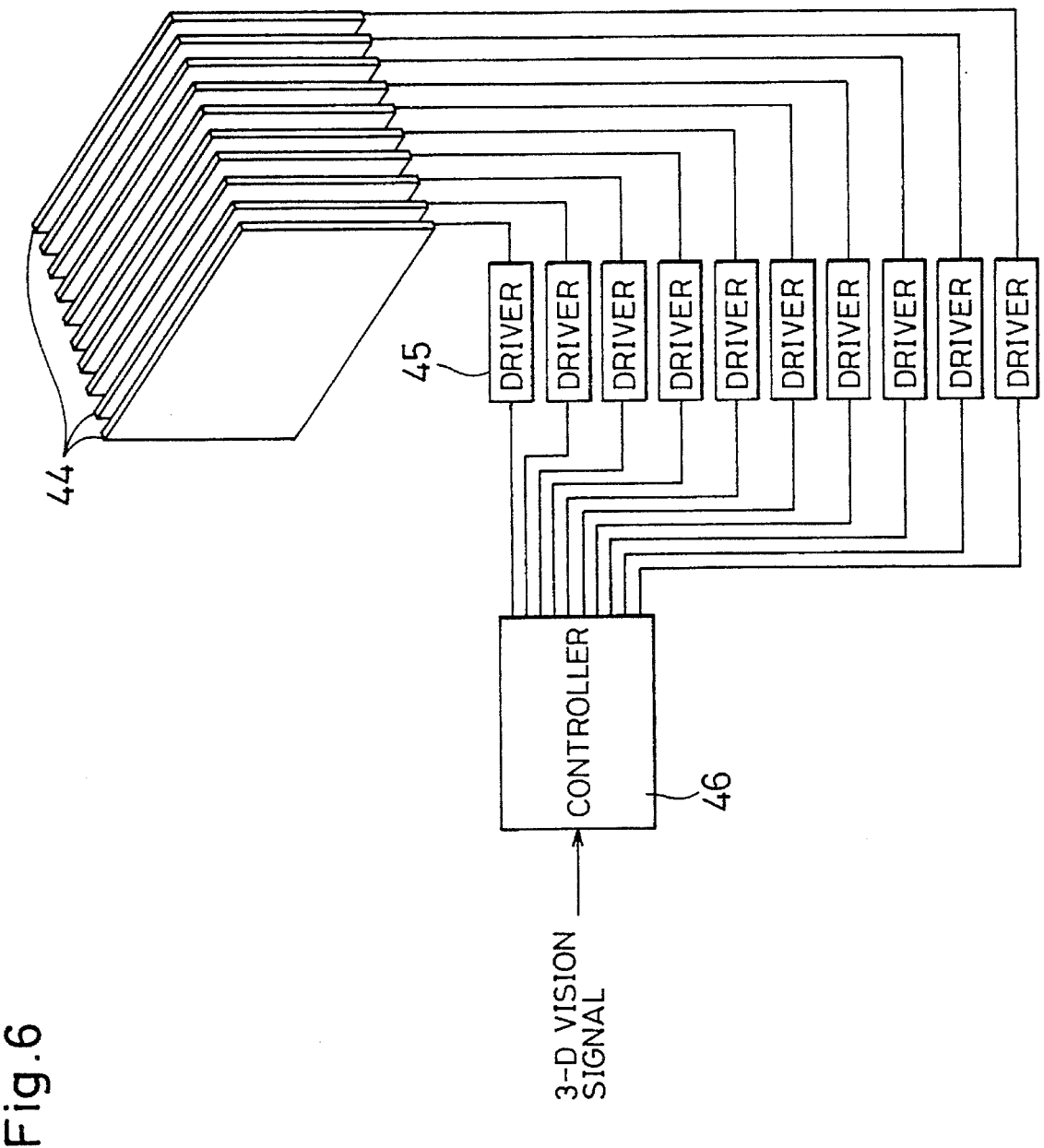
FIG. 6 shows a third arrangement of a three-dimensional image display apparatus.

The arrangements of display apparatuses for displaying three-dimensional images are shown in FIGS. 4 to 6. The display apparatus of FIG. 4 is of a projector-type including a projector 31 and a display screen 32. The projector 31 includes a projector lens 33, a lens driver 34, an image display 35, a display driver 36 and a light source 37. On the image display 35, an image according to the direction is displayed by the display driver 36. The light source 37 irradiates a light beam thereon so that the transmitted light beam is formed into an image on the display screen 32 by the projector lens 33. The projector lens 33 is moved along the optical axis by the lens driver 34. The distance from the projector 31 to the image formed surface is adjusted by the position of the projector lens 33. The display screen 32 movable vertically to the screen surface is moved by a screen driver 38 including a motor.

The projector 31 and the display screen 32 are controlled by a controller 39. The controller 39 extracts the video signal and the distance signal from the three-dimensional vision signal and supplies the video signal to the display driver 36 to display the image. Also, the controller 39 moves the projector lens 33 through the lens driver 34 and the display screen 32 through the screen driver 38 based on the distance signal. The projector 33 and the display screen 32 are moved in synchronism so that an always clear image is displayed on the display screen.

Figure 7:
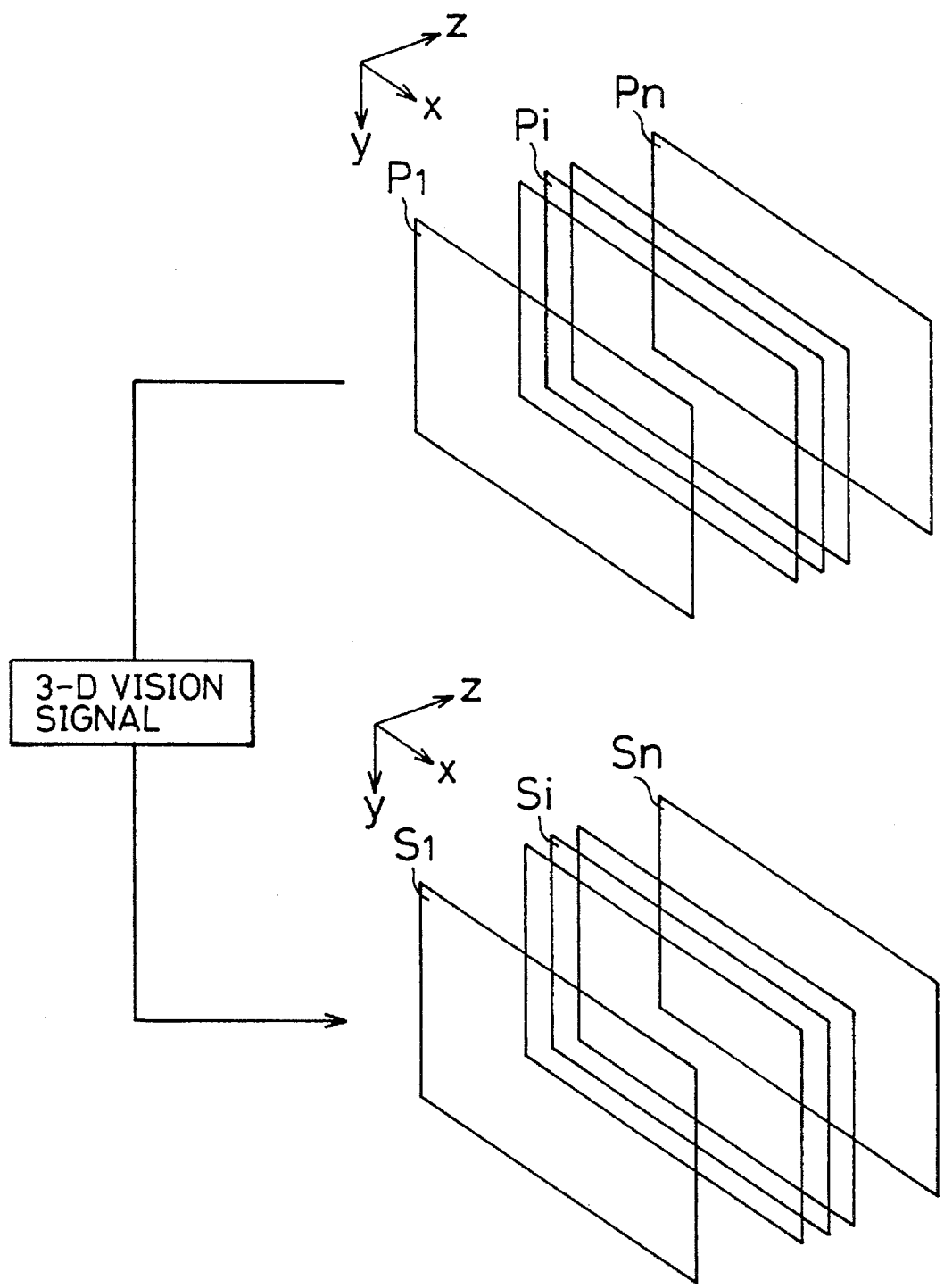
FIG. 7 shows a relationship between the photographing by the three-dimensional vision camera and the image display by the three-dimensional image display apparatus.

Referring to FIG. 7, there is shown a relationship between the photographing by the three-dimensional camera and the image display. P1 to Pn represents n in-focus positions corresponding to the positions of the taking lens 4. S1 to Sn represents the positions of the display screen 32 corresponding to P1 to Pn. A photographic object located at Pi (i=1, 2, ... n) is displayed when the display screen 32 is located at Si, so that a three-dimensional image is observed. The movement period of the display screen 32 coincides with the movement period of the taking lens 4.

The display apparatus of FIG. 5 uses a single liquid crystal panel 40. The liquid crystal panel 40 is moved vertically to the panel surface by a panel driver 41. In this case, a controller 43 extracts the video signal and the distance signal from the three-dimensional vision signal and supplies the video signal to a display driver 42 to display the image on the liquid crystal panel 40. The liquid crystal panel 40 is moved based on the distance signal. The movement of the liquid crystal panel 40 and the display of the image are performed in synchronism so that a photographic object located at P1 to Pn is displayed when the display panel 40 is located at S1 to Sn as shown in FIG. 7.

The display apparatus of FIG. 6 includes a plurality of transparent liquid crystal panels 44 laid one on another. The liquid crystal panels 44 are fixed and each has a display driver 45. The video signal and the distance signal are extracted from the three-dimensional vision signal by a controller 46, and the video signal is supplied to one of the display drivers 45 in accordance with the distance signal. Specifically, an image of an object at a short distance is displayed on a fore display panel and an image of a long distance object is displayed on a far display panel. By observing the image displayed in a plurality of layers from the front of the display panels 44, a three-dimensional image is observed.

As described above, in the three-dimensional vision camera of the present invention, since the taking lens is used also as the distance measuring optical system, the image position and the image distance never disagree with each other, so that a three-dimensional vision signal with no distortion is produced. As a result, a natural three-dimensional image is provided.

Obviously, many modifications and variations of the present invention are possible in light of the above teachings. It is therefore to be understood that within the scope of the appended claims, the invention may be practiced other than as specifically described.

What is claimed is:

1. A three-dimensional vision camera comprising:

a taking lens movable along its optical axis;

taking lens driving means for moving the taking lens;

a photographic light receiving device including photoelectric conversion elements arranged in a matrix form, said photographic light receiving device receiving a light beam transmitted by the taking lens to be incident on the photographic light receiving device so that each photoelectric conversion element outputs a video signal;

a light emitting device which emits a light beam irradiated to a photographic object;

a distance measuring light receiving device including photoelectric conversion elements arranged in an array form, said distance measuring light receiving device receiving a light beam emitted by the light emitting device and reflected by the photographic object so that each photoelectric conversion element outputs an electric signal;

a first optical device rotatable about an axis vertical to the optical axis of the taking lens, said first optical device being arranged behind the taking lens on the optical axis of the taking lens and reflecting the light beam emitted by the light emitting device toward the taking lens;

optical device rotating means for rotating the first optical device;

a second optical device arranged between the light emitting device and the first optical device, said second optical device transmitting a light beam advancing from the light emitting device to the first optical device and reflecting a light beam advancing from the first optical device to the light emitting device toward the distance measuring light receiving device;

controlling means for controlling the taking lens driving means so that the taking lens is stopped at a plurality of predetermined positions, said controlling means controlling the optical device rotating means to rotate the first optical device every time the taking lens is stopped at the plurality of predetermined positions so that a direction in which the light beam is reflected by the first optical device is varied, said controlling means outputting a taking lens drive amount and an optical device rotation amount; and three-dimensional vision signal outputting means supplied with the video signal outputted from the photographic light receiving device, the electric signal outputted from the distance measuring light receiving device and the taking lens drive amount and the optical device rotation amount outputted from the controlling means, said three-dimensional vision signal outputting means producing a distance signal representative of a distance to a photographed portion of the photographic object to which the light beam is irradiated by the light emitting device based on the taking lens drive amount and synthesizing the video signal and the distance signal into a three-dimensional vision signal when the electric signal is supplied from a predetermined photoelectric conversion element of the distance measuring light receiving device, said video signal being outputted from the photoelectric conversion element of the photographic light receiving device receiving the light beam from the photographed portion of the photographic object, said three-dimensional vision signal outputting means outputting the three-dimensional vision signal.

2. A three-dimensional vision camera according to claim 1, wherein said first optical device rotates about a first axis and a second axis which are vertical to the optical axis of the taking lens and vertical to each other, and wherein said controlling means rotates the first optical device about the first axis at a predetermined angle every time the taking lens is stopped at the plurality of positions and rotates the first optical device about the second axis every time the first optical device is rotated about the first axis.

3. A three-dimensional vision camera according to claim 1, wherein said first optical device includes a first prism rotatable about a first axis vertical to the optical axis of the taking lens and a second prism rotatable about a second axis vertical to the optical axis of the taking lens and the first axis, and wherein said controlling means rotates the first prism at a predetermined angle every time the taking lens is stopped at the plurality of predetermined positions and rotates the second prism every time the first prism is rotated.

4. A three-dimensional vision camera according to claim 1, wherein a half mirror is arranged between the taking lens and the first optical device, said half mirror transmitting the light beam emitted by the light emitting device and reflecting an image light beam, and wherein said photographic light receiving device receives a light beam reflected by the half mirror.

\* \* \* \* \*